Dec. 31, 1957 L. E. BROWNELL ET AL 2,818,358
TREATMENT OF SUGAR BEETS TO RELEASE JUICE
Filed Dec. 17, 1954 2 Sheets-Sheet 1
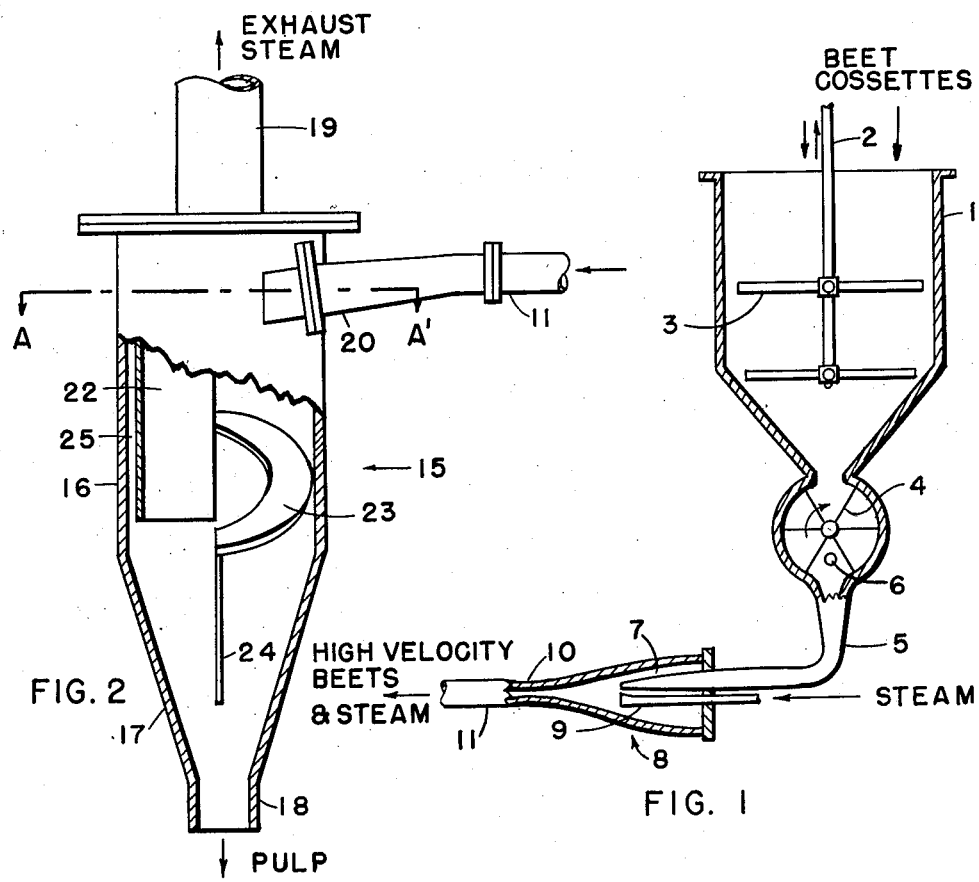
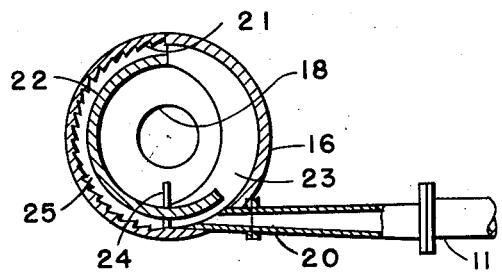
L. E. BROWNELL
S. A. ZIEMINSKI
INVENTORS
BY
ATTORNEYS

L. E. BROWNELL
S. A. ZIEMINSKI
INVENTORS

BY

ATTORNEYS

United States Patent Office 2,818,358
Patented Dec. 31, 1957

2,818,358

TREATMENT OF SUGAR BEETS TO RELEASE JUICE

Lloyd E. Brownell, Ann Arbor, Mich., and Stefan A. Zieminski, Orono, Maine, assignors to the United States of America as represented by the Secretary of Agriculture Application December 17, 1954, Serial No. 476,098

2 Claims. (Cl. 127—43)

This application is a continuation-in-part of our prior application Serial No. 386,141, filed October 14, 1953, now Patent No. 2,807,560.

This invention relates to sugar beets and has among its objects the provision of processes for treating sugar beets whereby to facilitate recovery of sugar-bearing juice from the beets. A particular object of the invention is the provision of a process in which the cell walls of sugar beets are ruptured by applying a sudden change of momentum to a stream of beet pieces moving at high velocity. By rupturing the cell walls the sugar-bearing juice is released from its natural sites and is easily separated from residual solids as by centrifugation, pressing, filtration, etc. Another particular object of the invention is the provision of a process adapted for continuous operation, wherein the abovementioned change in momentum is effectuated by causing the rapidly moving beet pieces to impinge on a barrier. Further objects and advantages of the invention will be apparent from the description herein and the annexed drawing.

The drawing annexed hereto illustrates apparatus suitable for use in carrying out the process. In the drawing, Fig. 1 is an elevation, partly in cross-section, of the feeder and ejector components.

Figs. 2 and 3 illustrate one embodiment of the disintegrator and separator apparatus. Fig. 2 is an elevation partly in cross-section whereas Fig. 3 is a cross-section taken on the plane A'—A' of Fig. 2.

Fig. 4 is an elevation, partly in cross-section whereas Fig. 5 is a cross-section taken on planes B'—B' of Fig. 4.

Figure 4:
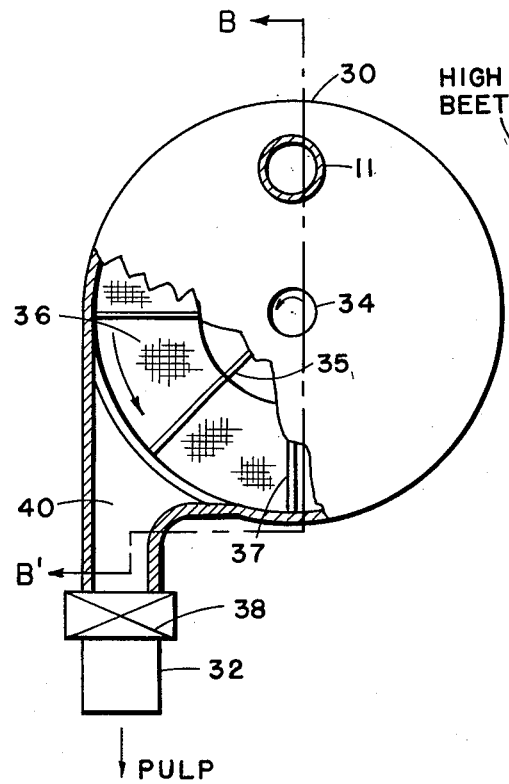
Figs. 4 and 5 depict an alternative embodiment of the disintegrator and separator device.

The production of sugar from sugar beets is a well-established industry in this country and abroad. One of the major problems in this industry concerns the initial preparation of the sugar-bearing juice from the beets. The current technique for obtaining the juice is known as diffusion and involves cutting the beets into strips, called cossettes, then treating the cossettes in a batch or continuous diffuser with hot water. One widely used type of continuous diffuser consists of a series of about twenty-one U-shaped cells, each approximately 2 ft. wide and 12 ft. deep. Each cell is set several inches higher than its predecessor so that the juice may flow by gravity through the cells. The cossettes are fed into the diffuser at one end of the lower tier and are carried by drag chains equipped with perforated steel-plate flights from one cell to the other through the entire length of the diffuser and finally discharged at the other end. The important point about diffusion is that it, as the name implies, is dependent on the diffusion of juice from the cells within the cossettes into the aqueous phase surrounding the cossettes. Since this diffusion through the cellular material is relatively slow, this method of obtaining the juice involves a long processing time and the equipment is bulky and occupies a large part of the floor space of the factory. Although the disadvantages of diffusion are well known and much experimentation has been done to devise methods to recover the juice by other techniques, no widely used successful alternative has heretofore been advanced.

It has now been found that the necessity for diffusion can be eliminated by a novel treatment of the sugar beets. In essence, this treatment involves accelerating beet pieces to a high velocity and then applying a sudden change of momentum to the rapidly moving beet pieces. The sudden change of momentum may be accomplished by causing a stream of the beet pieces moving at high velocity to impinge on a barrier. The result of such action is that the beet pieces are instantaneously disintegrated forming a pulp. This disintegration is desirable as the cell walls in the beet tissues are ruptured and the beet juice is easy to separate from residual solids. Thus the juice can be recovered from the pulp by pressing, centrifugation, filtration or leaching with water. Since the cell walls are ruptured, the sugar-bearing juice can flow freely out of the tissue, the movement of the juice being no longer limited by the physical process of diffusion through cell walls and other intact tissue.

By proceeding in accordance with this invention, the disintegration is essentially complete and uniform. That is, essentially every cell in the beet pieces is opened and the juice content of every cell thus released. The reason for such uniform action lies in the physical forces created by the abrupt change in momentum. This situation can be explained as follows: consider a single piece of beet moving at high speed and then suddenly striking a barrier so that it is abruptly stopped in its tracks. As the piece ceases to move, the liquid content of each cell will surge forward with great force due to the effect of momentum with the result that the cell walls will be stretched and finally ruptured.

An important feature of this invention is that the treatment does not adversely affect the quality of juice recovered from the beets. Experimental investigations have shown that the quality of the raw juice obtained from the beet pulp is not significantly lower than the quality of the juice obtained by the diffusion process. In particular, it has been observed that the proportion of invert sugar, pectin, and nitrogenous components is not significantly greater in the raw juice from beet pulp than in diffusion juice. In some cases it has been observed that the juice obtained by the process of this invention is better in quality, particularly after the usual purification, than the comparable purified juice from the diffusion process. The fact that the juice obtained in accordance with this process equals or exceeds the quality of diffusion juice is surprising indeed when it is considered that the impingement of the fast moving beet pieces in accordance with this invention causes disintegration of the beet pieces and it would be expected that this disintegration would cause the juice to contain excessive amounts of high molecular weight compounds such as pectins and proteins which in the usual diffusion procedure would remain in the tissue because they would not diffuse through the intact cell walls.

Another feature of the invention is that it is particularly adapted for continuous operation. The advantages of continuous operation includes reduction in retention time of the beets being processed, savings in labor and steam, dilution of the pulp with condensed steam is lessened and equipment of relatively small size can be used to process large amounts of beets.

Application of this invention is described in more detail, as follows:

Sugar beets are washed and preferably trimmed to remove the crown and root portions. The beets are then cut into pieces, such as dice, slices or strips such as cossettes as common in the industry.

The next step is to establish a stream of beet pieces moving at a high velocity, that is, a velocity greater than about 50 ft./sec. In general a velocity around 200–300 ft./sec. is preferred. The acceleration to such velocity can be accomplished in many ways. For example, the raw beet pieces may be dropped onto a rapidly spinning vaned disc thus to be impelled away from the center of the disc at high velocity by centrifugal force. Another technique involves placing the beet pieces in a closed chamber equipped with a conical bottom which tapers to a outlet pipe. The beet pieces are then subjected to a sudden burst of high pressure steam, air, or other gaseous medium. By this means the beet pieces are exploded out of the outlet pipe at high velocity. This explosion technique is described in detail in our prior application referred to above. The preferred technique however involves establishing a high velocity stream of a gaseous medium such as air, steam, or mixtures of air and steam, moving in a confined linear path at a velocity of at least about 200 feet per second. The sugar beet pieces, in a raw unheated state, are fed at a pre-determined rate into the gaseous medium whereby the beet pieces are accelerated to a velocity approaching that of the stream. The stream of gaseous medium and beet pieces are thereafter directed against a barrier whereby the stream impinges on the barrier, the resulting beet pulp is separated from the gaseous medium, and the juice thereafter separated from the pulp. In the above procedure, it is preferred that the gaseous medium be steam and that the time of contact between the steam and beet pieces be less than one second so that the beet pieces at the moment of impingement are in an essentially raw, uncooked, and firm condition. A convenient method of feeding the beet pieces into the stream is by use of an ejector, that is, the stream of gaseous medium is forced through a nozzle and the beet pieces are introduced into the stream at the point where the increased velocity of the moving gaseous medium passing through the nozzle creates an area of decreased pressure.

The last-named means of accelerating the beet pieces, that is, by feeding them into a high-velocity stream of gaseous medium, is preferred because of several advantages, as follows:

(a) The procedure permits continuous operation which results in savings in labor, equipment cost and processing time.

(b) The beet pieces can be accelerated to very high velocities with simple and relatively inexpensive apparatus. For example, except for the piping of the moving gaseous medium and a nozzle for converting the medium's pressure into kinetic energy, no pressure resistant equipment is required.

(c) The beet pieces are each accelerated to the same velocity with the result that disintegration is uniform throughout.

(d) The velocity of the pieces can be instantly controlled by adjustment of the velocity of the moving gaseous medium.

(e) The beet pieces are accelerated to a high velocity so rapidly that even if steam is used as the moving gaseous medium only a minor degree of heating of the pieces occurs. This is an important advantage in two ways. In the first place it means that steam which is a readily available and relatively inexpensive source of power can be used as the moving gaseous medium. Secondly, since the beet pieces are heated but slightly it means that little of the steam is condensed and as a result the juice eventually obtained is high in solids content. In producing beet sugar it is naturally desirable to recover the beet juice with as high a solids content as possible so that there will be less water to evaporate to produce dry sugar.

In order to accomplish disintegration of the beets, the stream of rapidly moving beet pieces is caused to impinge on a barrier surface. The barrier used may take various forms. For example one may use a sheet of screening, a sheet of perforated metal, a grid of metal bars, or a sheet of metal which is ribbed, scored, knurled, grooved, or otherwise roughened to present protuberant elements to the approaching beet pieces. Generally a perforated barrier is preferred as it is virtually self-cleaning. That is, the beet pulp will mostly go through the barrier and only a minor part will adhere thereto.

For best results, it is preferred that some means be provided to continuously scour the barrier surface to remove particles of pulp clinging thereto. By scouring, one is assured that the beet pieces will strike the bare surface of the barrier and there will be no cushioning effect caused by the pieces striking deposits of pulp on the barrier. Such cushioning will naturally decrease the effectiveness of disintegration. Various alternatives may be applied to achieve a scouring effect. For example the barrier may be rotated at a rate fast enough to throw off clinging pulp by centrifugal action. Where a rotating barrier is used the portion of the barrier not subjected to impingement of the beet pieces at any given moment may be subjected to scrapers, steam or air blasts, or brushes to remove adherent pulp. Instead of rotation, the barrier may be subjected to periodic vibration to remove deposited pulp. Where the barrier is made of perforated material it is possible to use two or more barriers placed so that any beet pieces not disintegrated by the first barrier will strike the second barrier and be disintegrated. As many barriers may thus be used applied in series to the stream of beet pieces as necessary to achieve maximum disintegration. Another advantage of the use of several barriers in series is that the energy of the fast-moving stream of beets may be spread over several barriers with the result that the danger of localized erosive damage to the barrier will be lessened. For example the barrier which first contacts the stream may have large openings so that only a part of the stream will contact the solid portions of the barrier. The second barrier then will receive the impact from the remaining part of the stream.

Where steam is used as the propulsive medium for accelerating the beet pieces, it is preferred to separate the steam from the pulp simultaneously with the formation of the pulp to avoid dilution of the pulp with condensed steam and to avoid excessive heating of the pulp. Apparatus for accomplishing such separation is described below.

The so-obtained pulp is then treated to separate the juice from the solid components of the pulp. This may be accomplished in many ways as for example by centrifugation, filtration, pressing, or leaching with water. A convenient technique is to centrifuge or filter the pulp until no more juice exudes therefrom, then wash the cake on the centrifuge or filter by spraying warm water on the cake while it continues to be rotated. In the alternative the cake may be removed, repulped with water or juice and the material centrifuged or filtered again. This procedure may be repeated as often as required to remove all the sugar from the cellular debris.

Reference is now made to the attached drawing which illustrates apparatus for carrying out the preferred modification of this invention. The construction and operation of the apparatus are described as follows:

Referring now in particular to Fig. 1, feeder 1 is a cylindrical vessel provided with a conical bottom. Raw sugar beet cossettes are introduced into feeder 1 directly from the beet cutters.

Centrally disposed within feeder 1 is a vertical shaft 2 bearing paddles 3. Shaft 2 is slowly reciprocated vertically by suitable mechanical device (not illustrated) to cause continuous agitation of the beet pieces so they will not stick together. If desired, shaft 2 may be caused to both rotate and reciprocate through the use of a sliding shaft and cam or other mechanical arrangement. In addition to the paddles, or in place thereof, one may introduce a tangential stream of air into vessel 1 to cause agitation of the beet pieces.

From the bottom of feeder 1, the cossettes are fed by impeller 4, which also acts as an air-lock, into pipe 5. The impeller 4 which is rotated by a suitable device such as a variable-speed electric motor (not illustrated) delivers the cossettes into pipe 5 at a predetermined, measured rate. To assist in the flow of the cossettes, air or steam is introduced at relatively low pressure on the order of 0.5 p. s. i. g. or less into the lower part of the impeller casing through port 6 which is connected by a suitable conduit (not illustrated) to a source of low-pressure air or steam.

The cossettes flow through pipe 5 into inlet chamber 7 of ejector 8. Simultaneously, steam, air, or other gaseous medium at high pressure is introduced into the ejector via nozzle 9. The high pressure stream of steam issuing from nozzle 9 creates a zone of negative pressure in chamber 7 whereby the cossettes are sucked into the stream and propelled through constricted throat 10 into pipe 11. This pipe is sufficiently long, on the order of several feet, to allow the particles of beets to be accelerated to high velocity.

During traverse of the cossettes through pipe 11 little heating of the cossettes occurs. This is primarily due to the very brief period during which the cossettes remain in the pipe. It is also to be noted that because of the jet action wherein the pressure of the steam is converted into kinetic energy there is a very slight pressure at the entrance to pipe 11 on the order of 3 to 6 p. s. i. g. Thus in this preferred modification of our invention, pressure change does not contribute to the disintegration of the beets. There is no explosive effect as with the process of our prior application.

In order to rupture the cells of the beets it is necessary to suddenly change the momentum of the fast-moving beets. This can be done for example by allowing the stream of beets to impinge on a barrier surface.

In Figs. 2 and 3 is shown apparatus for accomplishing a sudden change in momentum of the rapidly moving stream of cut beets and simultaneous separation of steam from the pulp.

The disintegrator and separator, generally designated as 15, includes a cylindrical vessel 16 provided with a conical bottom 17. For discharge of the beet pulp there is provided a discharge pipe 18; for discharge of separated steam there is provided vent 19. The high velocity stream of cossettes and steam is introduced into device 15 through pipe 11 and adapter 20 of rectangular cross-section. Adapter 20 is so positioned that the incoming stream of cossettes and steam enters cylinder 16 tangentially and also inclined downwardly about 10° from the horizontal. This means that the entering stream tends to swirl about the cylinder in a downwardly spiralling path.

About half of the inner periphery of cylinder 16 is provided with vertical grooves 21, cut the full length of the cylinder, to provide a surface on which the cossettes will impinge and be disintegrated. The size of these grooves is exaggerated in Fig. 3.

To ensure contact of the rapidly moving cossettes with the grooves 21, there is provided an arcuate baffle 22. Helical partition 23 and vertical baffle 24 are provided to assist in moving the pulp downward.

In operation, the rapidly moving stream of cut beets and steam issuing from adapter 20 swirls in a descending spiral in the space 25 between the inner surface of cylinder 16 and the outer surface of arcuate baffle 22. The cossettes impinge on the grooves 21 whereby the beet cells are uniformly and completely ruptured. The separated steam is discharged through vent 19; part of this steam can be cycled back to port 6 for carrying additional cossettes to the ejector 8. The steam can also be used for heating or evaporating purposes.

As the mass of beets now in the form of pulp flow past the grooved area of cylinder 16, the pulp guided by the undersurface of helical partition 23 strikes vertical baffle 24 and is then directed downward to discharge conduit 18.

It is evident that by varying the vertical displacement between adapter 20 and helical partition 23, the distance the stream of beets and steam has to travel in cylinder 16 can be varied. Thus by widely displacing components 20 and 23, the stream can be forced to complete one or more circuits through space 25 before being discharged through conduit 18. By varying the distance the stream must travel in space 25, the degree of disintegration can be controlled; obviously a longer path of travel will result in more disintegration.

Figure 5:
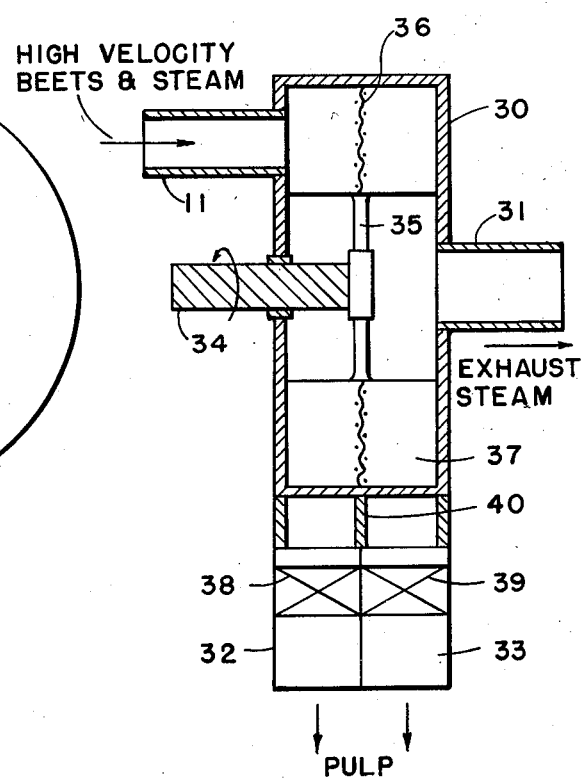

In Figs. 4 and 5 there is depicted an alternative form of device for accomplishing the disintegration of the cossettes and separation of the steam. Referring to these figures, the device includes a cylindrical casing 30 provided with inlet 11 for the high-velocity stream of beets and steam, vent 31 for discharging exhaust steam and outlets 32 and 33 for discharging beet pulp.

A shaft 34 protruding through one face of casing 30 carries spider 35 to which is attached screen 36 and blades 37. Shaft 34 is rotated in the direction shown by a suitable electric motor or the like (not illustrated).

In operation, the high-velocity stream of beets and steam entering the system via conduit 11 impinges against screen 36. This impingement, as explained hereinabove, causes disintegration of the beet pieces to form a pulp. Shaft 34 is rotated at such a speed that beet material does not collect on the screen 36 but is thrown off by centrifugal force. The blades 37 which rotate with the shaft and screen force the pulp out of the casing into pipes 32 and 33; steam which is separated from the beets is vented through duct 31.

Referring to Fig. 5, it can be seen that the pulp which passes through screen 36, that is, to the downstream side of the screen, is impelled by the right-hand portions of blades 37 into discharge pipe 33 whereas the coarser pulp which rebounds from the upstream side of screen 36 is impelled by the left-hand portions of blades 37 into discharge pipe 32. A vertical partition 40 located in the plane of screen 36 in the throat of casing 30 serves to direct the impelled material into the respective pipes 32 and 33. The coarser pulp leaving the system via pipe 32 may, if necessary, be again passed through the disintegrator. If desired, a single discharge pipe can be provided instead of the separate pipes 32 and 33 to discharge the pulp in a single stream.

To ensure positive separation of steam from the pulp, valves 38 and 39 may be adjusted to provide a small back-pressure to force the separated steam out of vent 31.

Since the function of blades 37 is to impel the pulp out of casing 30 into the discharge conduits 32 and 33, it is evident that the blades should be constructed so as to provide but a small clearance between the edges of the blades and the sides and inner periphery of casing 30.

The invention is further demonstrated by the following examples:

The purity of the various juices was determined in the customary way by determining the percent of sucrose by polarization, dividing this figure by the Brix of the juice and multiplying by 100. The purity is thus a measure of the ratio of sucrose to total soluble solids.

The abbreviation p. s. i. g. used herein means pounds per square inch, gauge pressure.

Example I

This experiment was conducted in an apparatus involving the principles of that described above. Nozzle 9 was of the convergent-divergent type with a throat diameter of 0.2" and an exit diameter of 0.317". Steam was supplied to this nozzle (as the gaseous medium for propelling the beet cossettes) at 110 p. s. i. g. and at the rate of 3.53 lbs./min. The total angle of convergence of the entrance of ejector throat 10 was 25° and the throat 10 had a diameter of 0.625". Pipe 11 was ¾" brass pipe, 37 5/16" long.

A lot of sugar beets was cut into cossettes about ¼ to ½" long. The raw (unheated) cossettes were fed into the high velocity stream of steam at the rate of 18.9 lbs./min. The maximum pressure in pipe 11 was about 5 p. s. i. g. The cossettes moving through pipe 11 at about 300 ft./sec. impinged against a baffle which in this case was stationary and consisted of a double 9-mesh brass screen (wire thickness 0.045") placed 45° to the direction in which the cossettes were moving. The pulp produced by the violent impingement of the cossettes on the screen had a temperature of about 70° C. (no steam separator was used). This pulp was centrifuged then the centrifuge cake was washed several times with warm water. It was found by analysis that 99.2% of the sugar originally present in the raw cossettes was recovered in the combined juice and wash water with a draft of 125.7% by weight. The washed centrifuge cake contained only 0.14% of the original sugar present in the cossettes.

*Example II*

The process as set forth in Example I was repeated under essentially the same conditions. It was found that 99.2% of the sugar originally present in the raw cossettes was recovered in the combined juice and wash water with a draft of 128.1% by weight. The washed centrifuge cake contained only 0.13% of the original sugar in the cossettes.

A. The raw juice (the combined centrifuged juice and water used to wash the centrifuged cake) was subjected to a standard purification treatment using progressive preliming, main liming, first and second carbonation.

B. A bath of the raw beet cossettes was extracted with water at 75–80° C. under conditions essentially the same as in the known diffusion technique. The diffusion liquor was subjected to the same purification treatment as described above.

Analytical results on the raw and purified juices are set forth below: (Both the tests A and B were made with the same lot of beets.)

|  | A<br>Process in accordance with this invention | B<br>Diffusion process |
|---|---|---|
| Purity of raw juice, percent | 89.7 | 90.2 |
| Pectin in raw juice, g./100 ml | 0.28 | 0.29 |
| Purity of purified juice, percent | 94.0 | 93.4 |
| Lime salts in purified juice, mg./100° Brix | 22 | 41 |
| Specific conductance of purified juice (at 18° C., diluted to 5° Brix), mhos/cm | 0.00135 | 0.00146 |

It was also observed that the color of the purified juice obtained from the pulp produced in accordance with this invention was much lighter in color than the purified diffusion juice.

It is evident from the above table that the purity of the raw juice prepared by the process of this invention was slightly lower than the purity of the diffusion juice. However upon purification, the purity of the juice from the instant process was higher than that of the purified diffusion juice. In addition, the table shows that the juice obtained by the present process did not contain any more pectin than in the diffusion process. This signifies that the present process does not result in extraction of any more undesirable material than the diffusion process. The data on lime content and specific conductance indicates that after purification, the juice obtained by the process of this invention is of better quality than the purified diffusion juice.

*Example III*

The process of Example I was repeated using essentially the same conditions except that in this case the cossettes were processed at the rate of 23 lb./min. and the steam consumption (for ejecting and disintegrating the beets) was 15 lbs. of steam per 100 lbs. of cossettes. The following results were obtained:

Sugar recovered _____ 98.5% (on beets).
Draft _____ 125.4% (on beets).
Sugar remaining in washed cake____ 0.27% (on beets).

The combined juice and washings were subjected to a standard purification treatment as in Example II. A sample of diffusion juice prepared from the same lot of beets was also subjected to the same purification for comparative purposes. The following results were obtained:

|  | A<br>Process in accordance with this invention | B<br>Diffusion process |
|---|---|---|
| Purity of raw juice, percent | 90.2 | 90.2 |
| Purity of purified juice, percent | 94.0 | 93.3 |
| Specific conductance of purified juice (at 18° C., diluted to 5° Brix), mhos/cm | 0.00132 | 0.00142 |

In addition it was observed that the purified juice made from the pulp produced in accordance with this invention was much lighter in color than the purified diffusion juice.

Having thus described the invention, what is claimed is:

1. A process for treating sugar beets to liberate the juice from the beet cells which comprises establishing a stream of gaseous medium moving in a confined linear path at a velocity of at least about 200 ft. per second, feeding raw unheated sugar beet pieces at a pre-determined rate into said stream whereby the beet pieces are accelerated to a velocity approaching that of the stream, directing the stream of gaseous medium and beet pieces against a barrier whereby the stream impinges on said barrier, separating the resulting beet pulp from the gaseous medium, and thereafter separating the juice from the pulp.

2. The process of claim 1 wherein the gaseous medium is steam and wherein the time of contact between the steam and the beet pieces is less than one second, so that the beet pieces at the moment of impingement are in an essentially raw, uncooked and firm condition.

References Cited in the file of this patent
UNITED STATES PATENTS

| 251,803 | Starkey | Jan. 3, 1882 |
| 258,912 | Goessling | June 6, 1882 |
| 263,571 | Parmenter | Aug. 29, 1882 |
| 269,741 | Taggart | Dec. 26, 1882 |
| 416,107 | Hyatt | Nov. 26, 1889 |
| 1,005,931 | Bosse | Oct. 17, 1911 |
| 1,353,349 | Krafft | Sept. 21, 1920 |
| 1,369,180 | Lindenberg | Feb. 22, 1921 |
| 1,372,891 | Mengelbier | Mar. 29, 1921 |
| 1,875,531 | Walton | Sept. 6, 1932 |
| 2,040,816 | Kaemmerling | May 12, 1936 |
| 2,119,887 | Myers | June 7, 1938 |
| 2,332,062 | Cutler | Oct. 19, 1943 |
| 2,512,523 | Fisher | June 20, 1950 |
| 2,616,466 | Lindner | Nov. 4, 1952 |
| 2,635,309 | Smith | Apr. 21, 1953 |